United States Patent [19]
Anderson

[11] Patent Number: 6,088,190
[45] Date of Patent: Jul. 11, 2000

[54] DISK DRIVE INCLUDING MULTI-STAGE ENVIRONMENTAL DIFFUSION BUFFER

[75] Inventor: Kurt M. Anderson, Louisville, Colo.

[73] Assignee: Seagate Technology, Inc., Scotts Valley, Calif.

[21] Appl. No.: 08/335,991

[22] Filed: Nov. 8, 1994

[51] Int. Cl.[7] .................................................. G11B 33/14
[52] U.S. Cl. ...................................................... 360/97.02
[58] Field of Search .................. 360/97.02, 97.01–97.03, 360/98.01

[56] References Cited

U.S. PATENT DOCUMENTS

| | | | |
|---|---|---|---|
| 4,620,248 | 10/1986 | Gitzendanner | 360/97.02 |
| 4,751,594 | 6/1988 | Blanks | 360/97.02 |
| 5,025,336 | 6/1991 | Morehouse et al. | 360/97.02 |
| 5,029,026 | 7/1991 | Stefansky et al. | 360/97.02 |
| 5,307,222 | 4/1994 | Dion | 360/97.02 |
| 5,447,695 | 9/1995 | Brown et al. | 360/97.02 |

FOREIGN PATENT DOCUMENTS 62-279588  12/1987  Japan .

OTHER PUBLICATIONS

"Air Filtration System For A Small Rigid File," IBM Technical Disclosure Bulletin, vol. 28 No. 10 Mar. 1986, pp. 4473–4474.

*Primary Examiner*—Jefferson Evans
*Attorney, Agent, or Firm*—Crowe & Dunlevy

[57] ABSTRACT

A method and apparatus for providing a relatively large, multi-chamber fluid buffer between the interior of the drive and the surrounding external environment. The large fluid buffer is provided by a plurality of channels and chambers stamped into the cover of the disk drive, through which channels and chambers fluid must diffuse in order to enter or exit the drive.

4 Claims, 3 Drawing Sheets

DISK DRIVE INCLUDING MULTI-STAGE ENVIRONMENTAL DIFFUSION BUFFER

FIELD OF THE INVENTION

The present invention relates to a disk drive which has fluid communication with the surrounding environment, and in particular to a low cost method and easily manufactured apparatus for minimizing the presence of contaminants such as particulates, corrosive gasses and water vapor within the interior of a disk drive.

BACKGROUND OF THE INVENTION

Conventional disk drives for use in work stations, personal computers, and portable computers, are required to provide a large amount of data storage within a minimum physical space. In general, disk drives operate by positioning a read/write transducing head over respective tracks on magnetic recording disks. Positioning of the head over the tracks is accomplished by an actuator coupled to control electronics, which control the positioning of the actuator, rotation of the disks and the read/write functions of the heads. With the advent of portable computers, disk drives are now required to reliably perform in a wide range of environments which may vary substantially with respect to temperature, pressure and humidity.

Conventionally, disk drives had been sealed to prevent pressure changes and to minimize the presence of contaminants within the drive. In order to accomplish this, the above-described components were hermetically sealed within a base and cover. However, where extreme pressure differentials exist between the interior and exterior of the drive, as may be caused at higher or lower elevations or at extreme temperatures, the hermetic seal of the disk drive was often broken, thereby allowing pressure changes and unfiltered contaminant entry into the drive. Attempts to improve the hermetic seal, as for example, by providing a flexible and compressible gasket around the periphery of the drive between the base and cover, have proven somewhat ineffective in totally isolating the interior of the drive from the external environment at extreme pressure and/or temperature conditions.

As result of the difficulty in providing completely sealed drives, some conventional drives have been provided with a breather filter which allows fluid to pass into and out of the drive so as to substantially equalize the internal pressure of the drive to that of the surrounding environment. Thus, fluids passing into the drive from the surrounding environment are filtered to remove contaminants therefrom. While breather filters are able to filter out many particulates from the surrounding atmosphere, they are relatively ineffective in preventing other contaminants from entering into the interior of the drive. For example, breather filters are unable to filter out corrosive gasses that may be found in the atmosphere, such as chlorine, which gasses act to erode the internal disk drive components. Similarly, breather filters are largely unable to prevent water vapor from entering into the interior of the drive. Water vapor can similarly have a corrosive effect on drive components, as well as causing problems such as stiction, where a disk drive head adheres to the disk surface and must be broken free upon start-up of the drive. Further still, while breather filters are largely effective in filtering out particulates, such particulates may buildup within the breather filter over time.

One solution to the problem of atmospheric diffusion into the interior of the drive has been proposed in U.S. Pat. No. 4,751,594 to Blanks, which discloses a serpentinian groove formed in a plate mounted on the cover of the drive. Prior to entering the interior of the drive, fluid from the external environment must pass through the grooves. Largely through control of the diameter of the groove, Blanks discloses that the pressure of the drive interior may be adjusted to that of the external environment while retarding water vapor diffusion into the drive.

Another solution to the problem of atmospheric diffusion is shown in U.S. Pat. No. 5,025,336 to Morehouse et al. In one embodiment of the invention, fluid from the external environment enters through holes in the cover, travels along a groove formed in the cover, and into a compartment which communicates with the interior of the disk drive. A planar desiccant may be provided within the compartment to remove contaminants such that the entering fluid travels through the desiccant from the topside to the bottom side, i.e., through the narrowest dimension of the desiccant. Moreover, there is only a single compartment separating the interior of the drive from the external environment. Similarly, in U.S. Pat. No. 4,620,248 to Gitzendanner, there is disclosed a disk drive including a tube and a desiccant through which fluid from the external environment travels. The tube and desiccant are provided within a single enclosed chamber inside the drive housing, which chamber communicates with the interior of the drive.

During nonoperational periods of the drive, and generally where there is little or no pressure and temperature differential between the interior and exterior of the drive, diffusion of fluid through the diffusion structure still occurs. With conventional diffusion structures having only one compartment, any contaminants from the external environment that diffuse into the compartment may subsequently enter the interior of the drive as result of further diffusion or as result of an influx of fluid into the drive interior upon a relative increase or decrease in external pressure or temperature, respectively.

Moreover, conventional diffusion structures are relatively complicated and/or expensive to manufacture in that they are formed from a number of die cast parts with intricate designs. Furthermore, during the life of a drive, contaminants such as water vapor may buildup within the diffusion tubes. In conventional diffusion structures including a desiccant compartment, while the desiccant removes water vapor from the structure, the desiccant produces particulates which may buildup in the tubes and/or compartment. It is not contemplated in conventional diffusion structures to allow access to the interior of the tubes or desiccant compartment so as to allow cleaning of the tubes or replacement of the desiccant.

Therefore, there is a need for an improved diffusion structure which overcomes the problems found in the prior art.

SUMMARY OF THE INVENTION

It is therefore an advantage of the present invention to provide an improved diffusion structure to minimize contaminant entry into a disk drive.

It is a further advantage of the present invention to provide an improved diffusion structure which may be easily and inexpensively manufactured.

It is another advantage of the present invention to provide an improved diffusion structure in which contaminant buildup may be easily cleared from the system so as to potentially prolong the effectiveness of the system.

These and other advantages are accomplished by the present invention which relates to a method and apparatus for providing a relatively large, multi-chamber fluid buffer between the interior of the drive and the surrounding external environment. The large fluid buffer is provided by a plurality of channels and chambers stamped into the cover of the disk drive, through which channels and chambers fluid must diffuse in order to enter or exit the drive.

With the large fluid buffer, if for example there is a pressure drop or temperature increase in the external environment, clean fluid from the drive is drawn out; but rather than exiting to the outer atmosphere, it may be held within the buffer. At least during low fluid flow periods, there is relatively little fluid flow between the respective chambers. Therefore, fluid expelled from the interior of the drive will be held in the chamber or chambers nearest the interior of the drive along the diffusion path, and the contaminant-rich fluid from the surrounding atmosphere remains in the chamber or chambers nearest the external environment along the diffusion path.

Given a sufficient period of time without environmental change, the clean fluid and contaminant-rich fluid will diffuse through each of the chambers and equilibrium will be established. However, as result of the relatively low mixing between the chambers, it takes a longer period of time than in conventional systems for the clean fluid from one end of the structure, and the contaminant-rich fluid from the other end, to diffuse through the entire structure. Therefore, when fluid is drawn into the interior of the drive, there is a greater likelihood that the entering fluid is the clean fluid which was stored in the chamber(s) nearest the drive interior.

In addition to the slower diffusion rates according to the present invention, contaminants are kept from the interior of the drive as result of settling and trapping of the contaminants along the diffusion path. Due to surface adhesion, contaminant particles may adhere to the channel and chamber walls. Additionally, desiccants may be provided in each of the chambers. In a preferred embodiment, the diffusion structure includes four chambers. Contaminants entering the first chamber are filtered out by settling, surface adhesion and/or a desiccant within the chamber. Contaminants that may pass through the first chamber are filtered out by the second chamber. Contaminants that may pass through the second chamber are filtered out by the third chamber, and finally, contaminants that may pass through the third chamber are filtered out by the fourth chamber. Thus, the diffusion structure according to the present invention provides a multi-stage filtration system that is more effective than previously known for preventing contaminants from entering into the interior of a disk drive.

The present invention further includes a top cover which fits over the diffusion structure to seal off the channels and chambers, thereby defining the diffusion path. The top cover may be easily removed and inexpensively replaced so as to allow removal of any contaminant buildup within the channels and chambers. Thus, the diffusion structure according to the present invention may effectively operate to remove contaminants from the entering fluid for the life of the disk drive.

BRIEF DESCRIPTION OF THE DRAWINGS

The invention will now be described with reference to the drawings in which.

DETAILED DESCRIPTION

The present invention will now be described with reference to FIGS. 1–5, which show a simple and inexpensive structure for effectively preventing contaminants from entering the interior of a disk drive. In a preferred embodiment, the diffusion structure is used in connection with a Winchester-type hard disk drive. However, it is understood that the structure according to the present invention may be used with various disk drives and with various other data storage devices.

Figure 1:
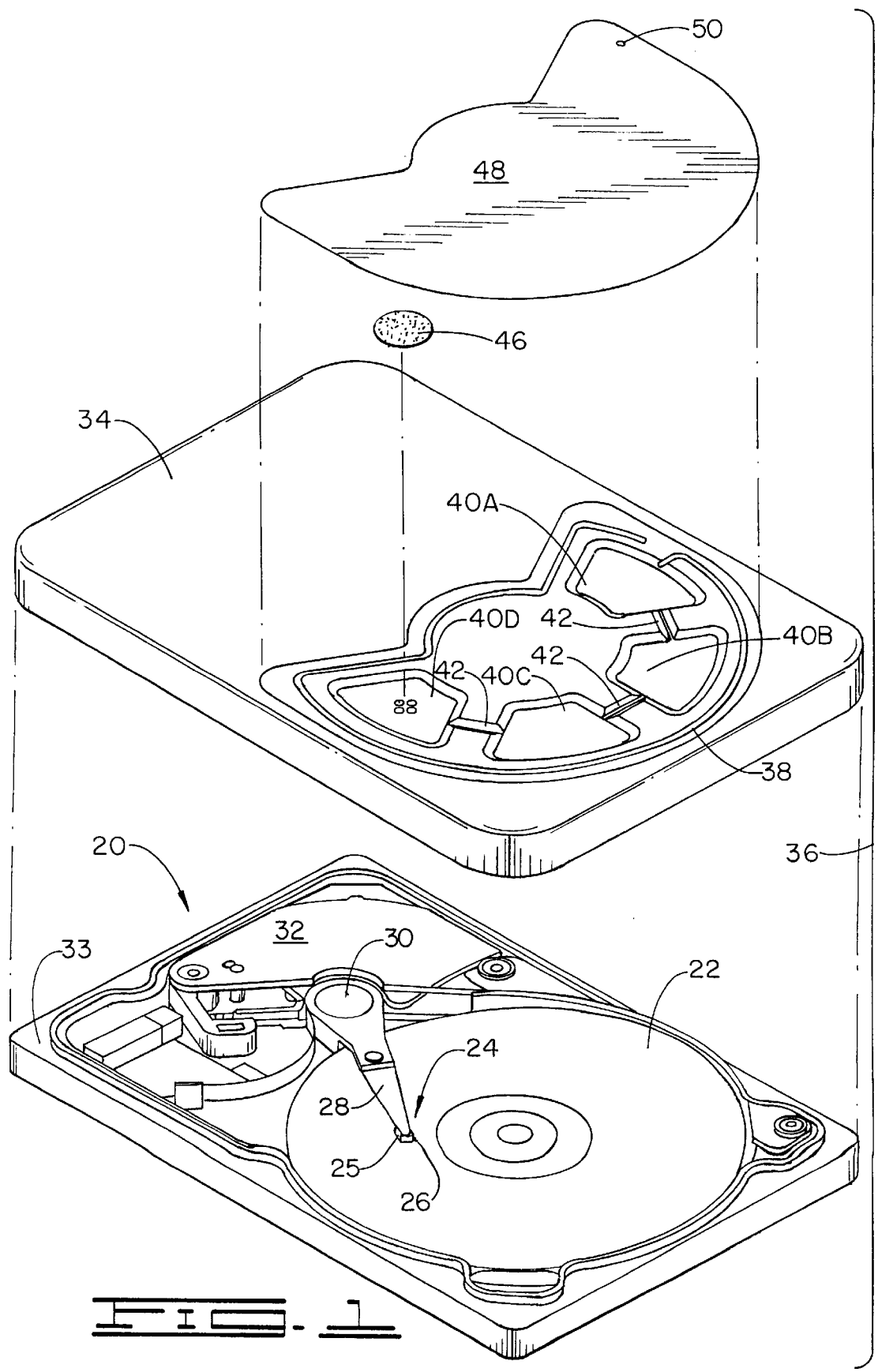
FIG. 1 is a perspective view of a disk drive including the diffusion structure according to the present invention.
Figure 2:
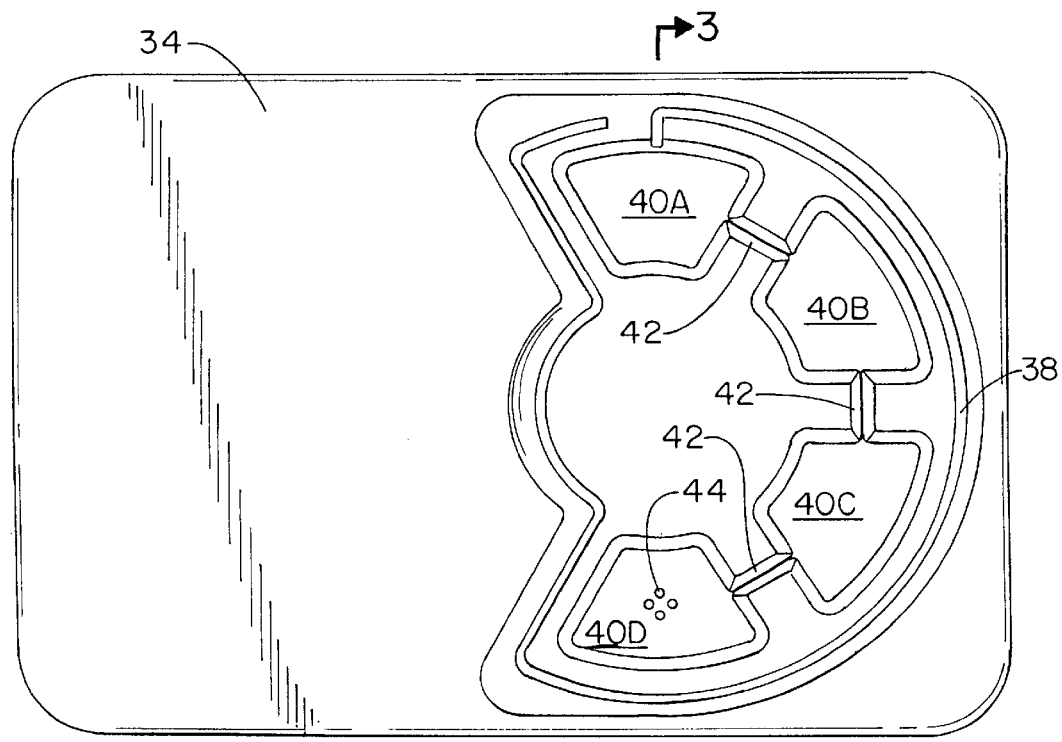
FIG. 2 is a top view of the disk drive cover showing the diffusion structure according to the present invention.
Figure 3:
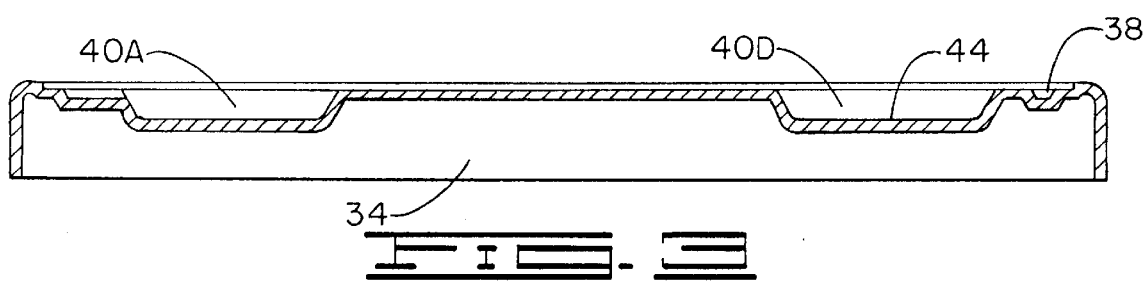
FIG. 3 is a cross-sectional view through line 3—3 in FIG. 2.
Figure 4:
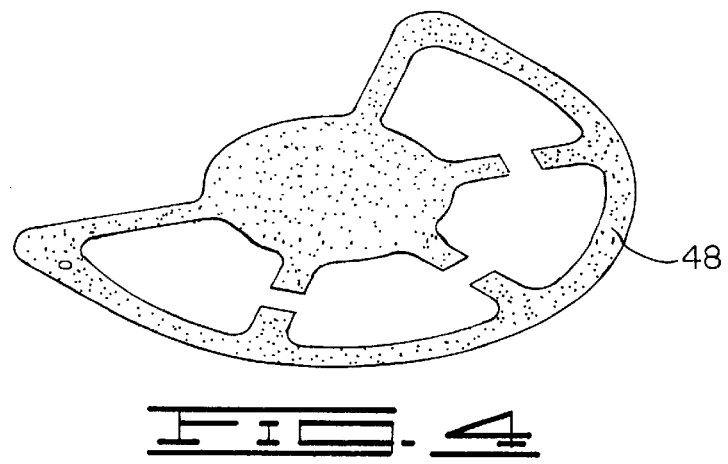
FIG. 4 is a perspective view of a top cover according to the present invention.
Figure 5:
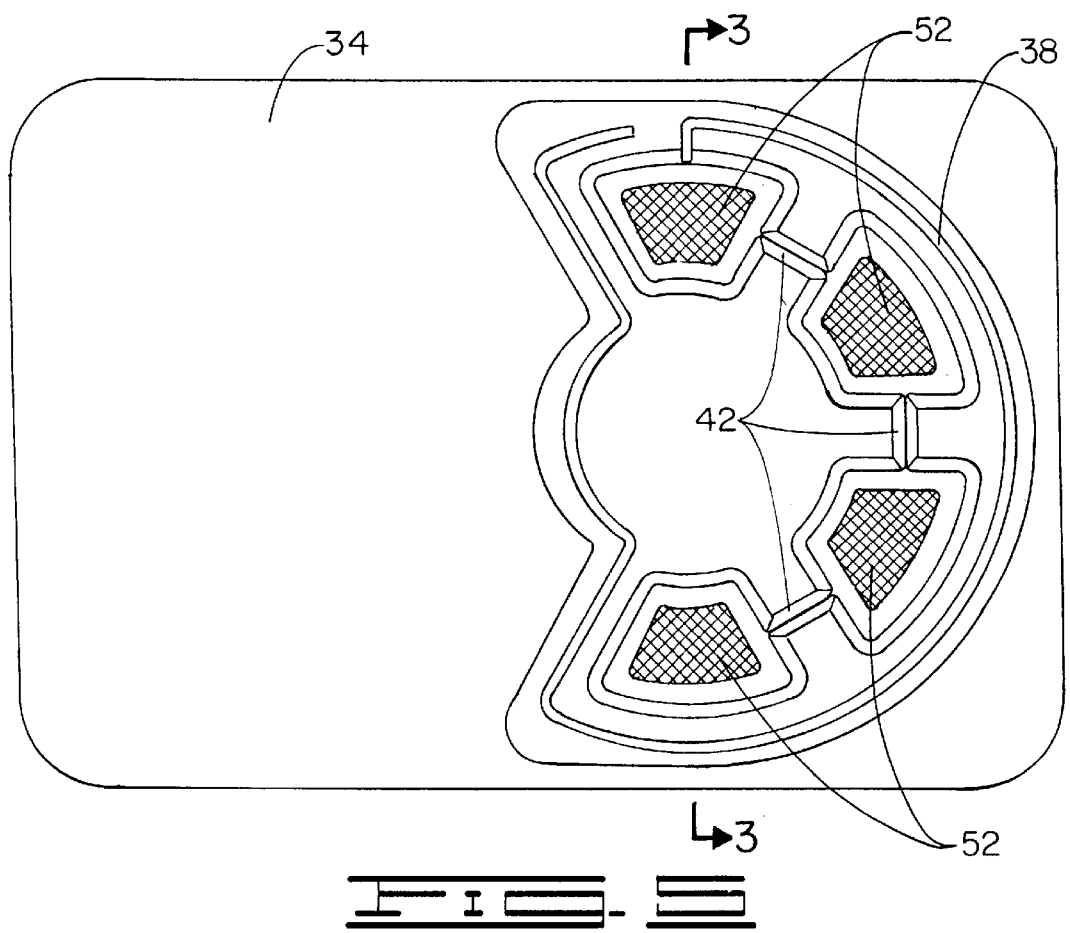
FIG. 5 is a top view of the chambers of the diffusion structure according to the present invention including desiccants.

Although not critical to the present invention, the diffusion structure may be used with a disk drive such as that shown in FIG. 1. Disk drive 20 may include a storage disk 22 and a read/write head 24. Read/write head 24 includes a transducer 25 mounted to a slider 26. The slider 26 is in turn supported on actuator arm 28. Actuator arm 28 is provided to pivot around pin 30 by voice coil motor 32 in response to control signals received from a printed circuit board (not shown). As is known in the art, during operation of the drive 20, disk 22 is rotated by a spin motor (not shown) and actuator 28 pivots read/write head 24 across the surface of the disk so that data is transferred between the read/write head 24 and the disk 22 in a plurality of concentric data tracks. The above-described disk drive components may be sealed within an interior of the drive by enclosing the components within a base 33 and a cover 34.

As discussed in the Background of the Invention section, it is important that the interior of the drive remain relatively free of contaminants. In order to accomplish this objective while still allowing the disk drive to communicate with and adjust to the external environmental conditions, the cover 34 may be provided with a plurality of stamped depressions, which, when covered, define a plurality of channels and chambers comprising the diffusion structure 36 according to the present invention. The diffusion structure may alternatively or additionally be formed in the base 33 in an alternative embodiment. As shown in FIGS. 1 through 4, the diffusion structure 36 includes an entry channel 38 having an arcuately shaped section and a zig-zag shaped section. The structure 36 further includes a plurality of buffer chambers $40_{a-d}$ and a plurality of communication channels 42 provided between and connecting the buffer chambers $40_{a-d}$. The final buffer chamber at the end of the diffusion path, in a preferred embodiment chamber $40_d$, includes a plurality of holes 44 allowing fluid transfer between the diffusion structure 36 and the interior of the drive. A filter 46 may be provided over the holes 44 to filter out particulates that may be left in the fluid entering the interior of the drive. As is known in the art, filter 46 may be formed from various materials, including expanded PTFE or Gortex®.

The entry channel 38, the buffer chambers $40_{a-d}$, and the communication channels 42 are substantially sealed so as to define a diffusion path by means of top cover 48. Top cover 48 and cover 34 lie in direct contact over the entire surface of one side of top cover 48 with the exception of the areas defined by entry channel 38, buffer chambers $40_{a-d}$ and communication channels 42. An adhesive may be applied to the contact side of top cover 48 so as to restrict fluid diffusion to only within the channels and chambers. As described in greater detail below, top cover 48 may preferably be formed from a durable and inexpensive material which may be easily removed and replaced. Any of various polymer compounds may be used for top cover 48, including for example polycarbonate. A hole 50 may be provided in top cover 48 to allow diffusion of fluid between diffusion structure 36 and the external environment. Hole 50 represents the sole intended entry point in disk drive 20 for entry of fluid into the drive.

In practice, upon an increase in the external pressure or a decrease in the external temperature, fluid will flow from the atmosphere into diffusion structure 36 through hole 50. Once inside the diffusion structure, the fluid travels along entry channel 38, then into buffer chambers $40_a$, $40_b$, $40_c$, and $40_d$, respectively, via each of the communication channels 42. As stated above, upon reaching the final buffer chamber, the fluid may thereupon enter the interior of the drive. It is understood that in alternative embodiments, there may be greater or lesser than four buffer chambers and three communication channels. Where pressure of the external environment decreases or temperature increases, it is understood that fluid will flow in a direction opposite to that described above.

In a preferred embodiment, disk drive 20 is a 3½ inch form factor drive with outer dimensions of approximately 5¾ inches in length, by 4 inches in width, by 1 inch in height. Owing to the thickness of the walls and the space occupied by the internal disk drive components, at sea level (14.7 psia) and room temperature (25° C.), the interior of disk drive 20 can hold approximately 6 cubic inches of fluid. It is contemplated that disk drives will be operated at extreme conditions, such as for example at elevations up to 10,000 feet and at temperatures ranging from about 5° C. to 55° C. The volume of fluid held within the diffusion structure 36 is approximately equal to 25% of the typical volumetric change experienced by drive 20 as result of changes in pressure and/or temperature.

In a preferred embodiment, the entry channel 38 may have a cross-sectional area of approximately 0.0006 square inches, and an overall length of approximately 10.25 inches. Communication channels may preferably be formed with sloped walls which extend approximately 0.06 inch deep into the cover 34, thereby having a cross-sectional area of about 0.0035 square inches. The length of each communication channel is preferably about 0.44 inches. It is understood that the shape of entry channel 38 and communication channels 42 may vary both with respect to their cross-sectional profile and length. Each of the chambers is preferably arcuately shaped, having an arcuate length of about 1.125 inches at a largest, outermost arcuate segment, and an arcuate length of 0.5 inches at smallest, innermost arcuate segment. The radial length of each chamber 40 is approximately 0.625 inches, and each chamber has a depth of about 0.06 inch. As above, the dimensions of the chambers $40_{a-d}$ may vary in alternative embodiments. With these dimensions, at sea level and room temperature, the diffusion structure 36 can hold approximately 0.11 cubic inches of fluid.

During nonoperational periods of the drive, and when there is little or no pressure and temperature differential between the interior of the drive and the surrounding external environment, fluid will still flow at a low rate through the diffusion structure from the external environment and/or the drive interior. In conventional diffusion structures having a single compartment, "clean" fluid from the interior of the drive, i.e., fluid which is relatively free of contaminants, diffuses into the compartment and mixes with contaminant-rich fluid that has entered the compartment from the external environment. Thereafter, when fluid is drawn back into the drive interior, it is a mixture of the clean and contaminant-rich fluid.

However, it is a feature of the present invention that, at least at low fluid flow rates, there is relatively little mixing of fluids between the respective chambers $40_{a-d}$. This is true because the communication channels 42 between each of the chambers act as throttle valves to thereby inhibit flow between the chambers $40_{a-d}$.

Therefore, clean fluid that diffuses from the drive interior is stored in the chamber or chambers nearest the interior of the drive along the diffusion path. Similarly, the contaminant-rich fluid from the exterior of the drive diffuses into the chamber or chambers nearest the exterior environment along the diffusion path.

Given a sufficient amount of time, the clean fluid and contaminant-rich fluid will diffuse through each of the chambers, thereby establishing equilibrium within the structure 36. However, the plurality of buffer chambers and throttling communication channels according to the present invention provide for slower diffusion rates than in conventional systems, and the clean fluid remains separated from the contaminant-rich fluid within diffusion structure 36 for a greater period of time.

Therefore, if environmental conditions change and fluid is drawn back into the drive prior to equilibrium having been established, the fluid drawn into the interior is the previously-expelled clean fluid that is stored in the chamber (s) nearest the interior of the drive along the diffusion path. Thus, the plurality of chambers offer an improved system for minimizing contaminants within the interior of the drive.

In addition to slowing the diffusion rate through the diffusion structure, the plurality of chambers $40_{a-d}$ may provide a multi-stage filtration system that further prevents contaminants such as particulates and water vapor from the external environment from reaching the interior of the drive. As is known according to the van der Waals effect, as fluid moves around within each of the channels 38, 42 and chambers $40_{a-d}$, contaminants within the fluid impinge on the side walls where they are trapped due to surface adhesion. Further, water vapor will be filtered out of the fluid as it travels through the diffusion structure 36 as result of condensation onto the walls of the channels and chambers. Additionally, especially at the lower flow rates accomplished by the present invention, settling of certain particulates within the fluid will also occur. Further still, in one embodiment of the invention shown in FIG. 5, each of the chambers $40_{a-d}$ may include a desiccant 52 of known material. Contaminants entering into the first chamber $40_a$ will be filtered out by surface adhesion, condensation, settling and/or by desiccant 52 provided within the chamber. Contaminants that may pass through chamber $40_a$ will be filtered out in a similar fashion by chamber $40_b$. Contaminants that may pass through chamber $40_b$ will be filtered out by chamber $40_c$, and finally, contaminants that may pass through chamber $40_c$ will be filtered out by chamber $40_d$. The channels 38 and 42 additionally act to filter contaminants from the fluid in a similar manner.

A further feature of the present invention is that access to all areas of the interior of diffusion structure 36 may be obtained by quick and easy removal of top cover 48. After a disk drive has been in use for some time, the top cover 48 may be removed in order to replace an old desiccant and/or to clean out contaminant buildup on the walls of the channels and chambers, thus maintaining the effectiveness of the filtration system and possibly improving the longevity of the disk drive. Moreover, the diffusion structure is formed together with cover 34 as a unitary construction. This offers an advantage over conventional diffusion structures which had many pieces which are costly to manufacture and, if they could be accessed at all, would be difficult and costly to clean.

A known pressure sensitive adhesive may be provided on the side of top cover 48 in contact with the upper surface of cover 34. After the drive has been in use for some period of time, top cover 48 may be removed to allow desiccants 52 to be replaced and the channels and chambers to be cleaned. Thereafter, a new top cover 48 is affixed onto cover 34. Top cover 48 is easily and inexpensively fabricated from a low cost polymer, and thus may be replaced without great expense. Similarly, once the top cover 48 has been removed, each of the channels and chambers may be easily accessed so that desiccants 52 may be easily removed and the channels and chambers may be efficiently and inexpensively cleaned.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

I claim:

1. A diffusion structure for allowing fluid flow between an interior of a disk drive and a surrounding external environment, comprising:

an entry channel having a first end connected to the external environment, and a second end at an opposite end of said entry channel;

a plurality of chambers, a first chamber of said plurality of chambers connected to said second end of said entry channel, and a second chamber connected to the interior of the disk drive;

a plurality of channels interconnected between said plurality of chambers, said plurality of channels inhibiting flow between said plurality of chambers at least at certain fluid flow rates;

a housing for the disk drive in which said entry channel, said plurality of chambers and plurality of channels are formed; and a cover affixed to said housing over said plurality of chambers and plurality of channels so as to define a diffusion path through said plurality of chambers and plurality of channels.

2. A diffusion structure as recited in claim 1, wherein said cover may be removed and replaced to allow removal of contaminant buildup within said plurality of chambers and plurality of channels.

3. A diffusion structure as recited in claim 1, wherein a desiccant is provided in chambers of the plurality of chambers.

4. A method of preventing contaminants within a fluid from entering into an interior of a disk drive, comprising the steps of:

defining a first diffusion path for the fluid by providing an entry channel that receives the fluid from an external environment;

defining a second diffusion path by providing a plurality of buffer chambers between the entry channel and the interior of the drive, the second diffusion path including a plurality of connecting channels between the plurality of buffer chambers; and inhibiting fluid flow along the first and second diffusion paths so that fluid from said interior of the drive is more likely to remain in chambers of said plurality of chambers nearest the interior of the drive along said first and second diffusion paths as opposed to chambers of said plurality of chambers nearest said external environment, and fluid from said external environment is more likely to remain in the entry channel and chambers of said plurality of chambers nearest said external environment along said first and second diffusion paths as opposed to said chambers nearest the interior of the drive.

* * * * *